(12) United States Patent
Michalopoulos

(10) Patent No.: US 9,365,096 B2
(45) Date of Patent: Jun. 14, 2016

(54) MOTOR VEHICLE WITH DRIP RESISTANT TEXTURED SURFACE FEATURE AROUND BODY SIDE OPENING ABOVE DOOR

(71) Applicant: FORD GLOBAL TECHNOLOGIES, LLC, Dearborn, MI (US)

(72) Inventor: George Michalopoulos, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/509,625

(22) Filed: Oct. 8, 2014

(65) Prior Publication Data

US 2016/0101671 A1    Apr. 14, 2016

(51) Int. Cl.
| | |
|---|---|
| *B60J 5/04* | (2006.01) |
| *B62D 25/06* | (2006.01) |
| *B62D 25/04* | (2006.01) |
| *B29C 65/50* | (2006.01) |
| *B29L 31/30* | (2006.01) |

(52) U.S. Cl.
CPC ............ *B60J 5/0493* (2013.01); *B29C 65/50* (2013.01); *B62D 25/04* (2013.01); *B62D 25/06* (2013.01); *B29L 2031/3055* (2013.01)

(58) Field of Classification Search
CPC ........ B60J 5/0493; B60J 5/0494; B62D 25/07
USPC .............. 296/213, 152, 154, 146.9; 49/476.1
See application file for complete search history.

(56) References Cited

U.S. PATENT DOCUMENTS

| | | | | |
|---|---|---|---|---|
| 2,278,646 | A * | 4/1942 | Clark | B60J 1/16 49/476.1 |
| 2,686,691 | A * | 8/1954 | Burrell | B60R 13/07 296/107.05 |
| 4,304,435 | A * | 12/1981 | Everts | B60J 10/0045 296/213 |
| 4,685,718 | A * | 8/1987 | Steenblik | B60J 1/20 296/154 |
| 5,106,146 | A * | 4/1992 | Hanlon | B60J 10/04 296/154 |
| 5,251,953 | A * | 10/1993 | Willey | B60J 1/2002 296/152 |
| 5,460,425 | A * | 10/1995 | Stephens | B60J 1/20 296/152 |
| 5,782,523 | A * | 7/1998 | Heldt | B60J 5/043 296/146.6 |
| 6,019,414 | A * | 2/2000 | Pourciau, Sr. | B60J 1/20 160/DIG. 4 |
| 8,424,953 | B2 | 4/2013 | Kawano et al. | |
| 2011/0097985 | A1 * | 4/2011 | Stauffer | B60J 5/04 454/162 |

FOREIGN PATENT DOCUMENTS

| | | |
|---|---|---|
| CN | 202593245 U | 12/2012 |
| CN | 202782611 U | 3/2013 |
| CN | 203472490 U | 3/2014 |

(Continued)

OTHER PUBLICATIONS

Machine Translation of DE102009036050A1, printed from the EPO website, Sep. 16, 2015.*
English Machine Translation of CN202593245.

(Continued)

*Primary Examiner* — Jason S Morrow
(74) *Attorney, Agent, or Firm* — Jason Rogers; King & Schickli, PLLC

(57) ABSTRACT

A motor vehicle has a body including a header margin at least partially defining a body side opening. The motor vehicle further includes a first door received in and closing at least a first portion of the body side opening and a drip resistant textured surface feature provided along the header margin above the first door.

6 Claims, 4 Drawing Sheets

(56) References Cited

FOREIGN PATENT DOCUMENTS

| | | | |
|---|---|---|---|
| DE | 102009036050 A1 | * | 12/2010 |
| JP | H11106720 A | | 4/1999 |

OTHER PUBLICATIONS

English Machine Translation of CN202782611.
English Machine Translation of CN203472490.
English Machine Translation of JPH11106720.

* cited by examiner

MOTOR VEHICLE WITH DRIP RESISTANT TEXTURED SURFACE FEATURE AROUND BODY SIDE OPENING ABOVE DOOR

TECHNICAL FIELD

This document relates generally to the motor vehicle field and, more particularly, to a motor vehicle incorporating a drip resistant textured surface feature that is provided along the header margin and/or the A-pillar around the body side opening above the front and/or rear door.

BACKGROUND

Under certain conditions water along the A-pillar and/or header area above the body side opening will trickle into the vehicle cabin and/or onto an occupant of the associated seat, when a front door, a rear door or combination of both are opened or closed in parallel or independently of each other. This condition is associated on all vehicles, coupes, sedans, cross-over, sport utilities, trucks and exacerbated on vehicles incorporating rear hinged rear doors. Such a door design is particularly useful on super cab pickup trucks where the extra wide side opening is beneficial when entering or loading the cab.

More specifically, as illustrated in FIG. 1, when the rear hinged rear door R is closed (note action arrow A), air is forced into the interior compartment. When the front door F is open, this increase in interior air pressure is relieved by air flowing outwardly and upwardly along the header area and A-pillar (note action arrows B). This air movement has a tendency to cause water along the header area H and A-pillar P to trickle from the body through the body side opening O into the cabin C of the vehicle V, potentially landing on an occupant or the seat. This is a very unsatisfactory result for the vehicle operator.

This document relates to a new, simple and relatively inexpensive method and device for addressing and virtually alleviating this problem. More specifically, a drip resistant textured surface feature is provided along the header margin and/or A-pillar above the door. Advantageously, the textured surface is engineered to enhance the surface tension of the water thereby enabling water disturbed by the airflow indicated by action arrow B to form beads that are retained on the surface rather than trickling into the vehicle and causing customer dissatisfaction.

SUMMARY

In accordance with the purposes and benefits described herein, a motor vehicle is provided comprising a body including a header margin at least partially defining a body side opening and a door received in and enclosing at least a first portion of the body side opening. Further the motor vehicle includes a drip resistant textured surface feature provided along the header margin above the door.

In one embodiment, the body further includes an A-pillar defining a portion of the body side opening and a drip resistant textured surface feature is also provided along that A-pillar.

In one embodiment, the vehicle further includes a second door received in and enclosing at least a second portion of the body side opening. In one embodiment, the textured surface feature is also provided along the header margin above the second door. Further the body includes a C-pillar. In one embodiment, the first door hinges adjacent the A-pillar and the second door hinges adjacent the C-pillar.

In one embodiment, the drip resistant textured surface feature comprises an adhesive tape having a textured surface. In one embodiment, that textured surface includes a series of parallel ridges. In one embodiment, a plurality of parallel ridges run horizontally along the adhesive tape substantially aligned with an upper edge of the body side opening. In another possible embodiment, the textured surface includes crosshatching.

In accordance with an additional aspect, a method is provided for reducing the dripping of water from a header margin of the body overlying a body side opening of a vehicle. That method may be broadly described as comprising the step of applying a drip resistant textured surface feature along the header margin above the body side opening. In one possible embodiment, the applying step further includes positioning adhesive tape along the header margin wherein the adhesive tape includes a textured surface. In one embodiment the method further includes also applying the drip resistant textured surface feature along an A-pillar margin of the body side opening.

In the following description, there are shown and described several preferred embodiments of the motor vehicle. As it should be realized, the motor vehicle is capable of other, different embodiments and its several details are capable of modification in various, obvious aspects all without departing from the motor vehicle as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the motor vehicle and together with the description serve to explain certain principles thereof. In the drawing figures.

Reference will now be made in detail to the present preferred embodiment of the motor vehicle, examples of which are illustrated in the accompanying drawing figures.

DETAILED DESCRIPTION

Figure 1:
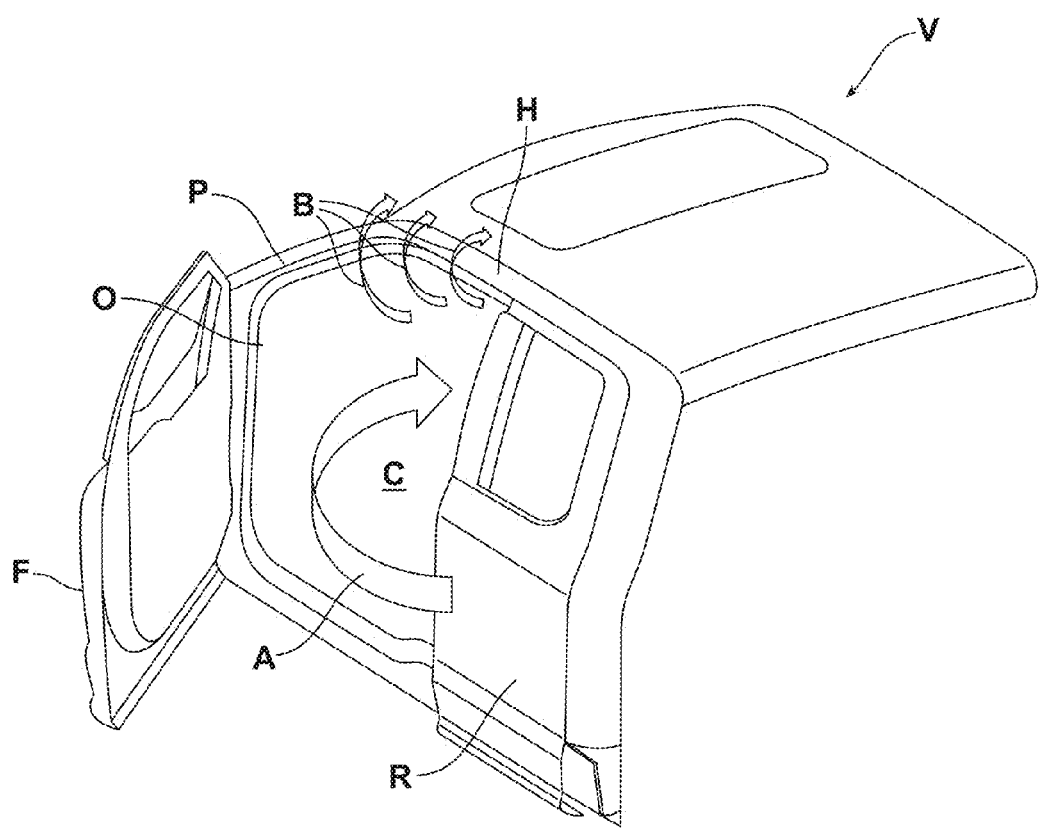
FIG. 1 is a perspective view of a portion of a body of the motor vehicle showing first and second doors which close a body side opening and the resulting airflow that has a tendency to cause trickling of water into the vehicle interior compartment.
Figure 2:
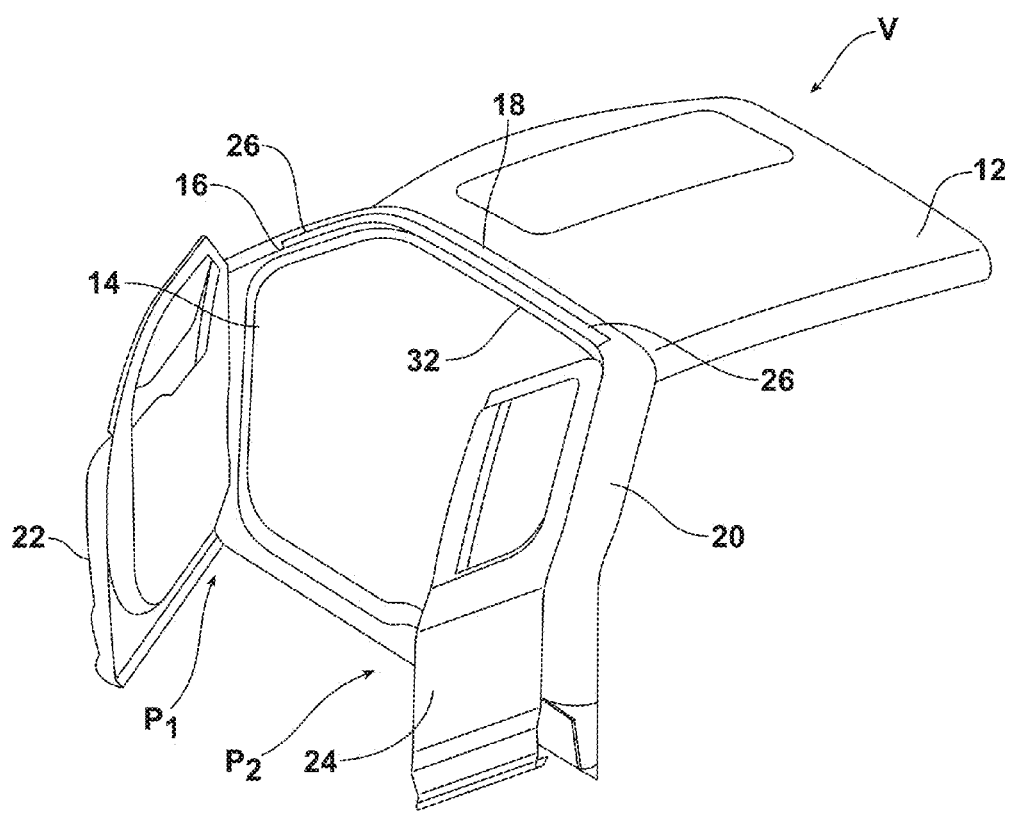
FIG. 2 is a perspective view illustrating the header margin above the body side opening where the drip resistant textured surface feature is provided.

Reference is now made to FIG. 2 illustrating a motor vehicle V including a body 12 having a body side opening 14 at least partially defined by the A-pillar 16, the header area 18 and the C-pillar 20. As illustrated, a first portion $P_1$ of the body side opening 14 is closed by a first or front door 22 and a second portion $P_2$ of the body side opening is closed by a second or rear door 24.

Figure 3:
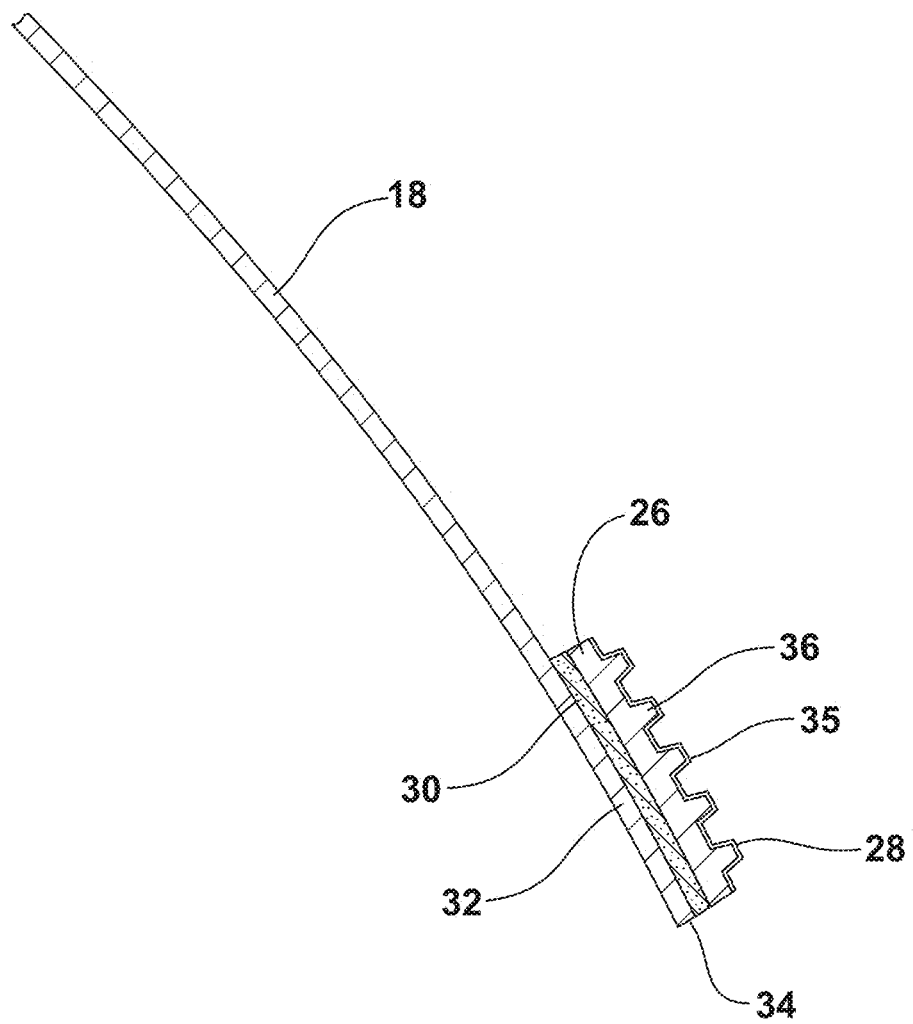
FIG. 3 is a detailed cross-sectional view providing a schematical illustration of the tape positioned along the header margin above the body side opening.

As further illustrated in FIGS. 2 and 3, a drip resistant textured surface feature 26 is provided along the header area 18 above the body opening 14 overlying the first door 22 and/or the second door 24. Further, if desired, the drip resistant textured surface feature may also be provided along the A-pillar 16.

In one particularly useful embodiment, the drip resistant textured surface feature 26 comprises an adhesive tape having a textured surface 28 and an adhesive backing 30. As best illustrated in FIG. 3, tape 26 is applied along the header margin 32 that defines the body side opening 14 along the top edge 34 of that opening. There the tape 26 is held in place by the adhesive backing 30.

Figure 4A:
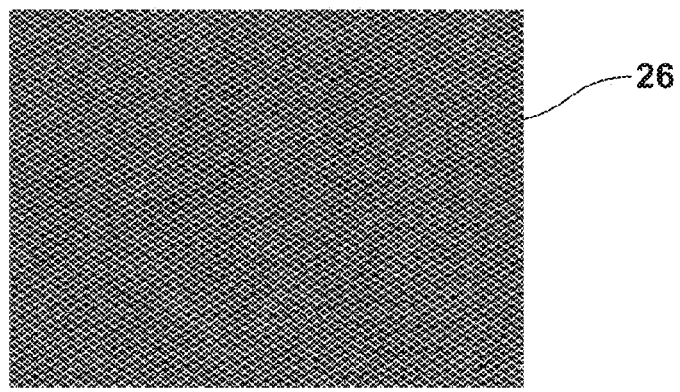
FIGS. 4a-4c are three plan views illustrating three different surface textures that may be applied in order to provide the desired drip resistance above the body side opening and doors.

In one possible embodiment the tape 26 is made from a clear polyvinyl chloride material. The tape 26 may include a protective clear coat 35. Further, the textured surface 28 of the tape 26 may be made by thermal form embossing. The textured surface may include or comprise a plurality of parallel ridges 36. As illustrated in FIG. 4a, the ridges 36 may comprise fine repeating horizontal lines that are 0.1 mm in width with 0.1 mm intervals. In another embodiment illustrated in FIG. 4b, the fine repeating horizontal ridges 36 may have a width of 0.1 mm at 1.0 mm intervals.

Figure 4B:
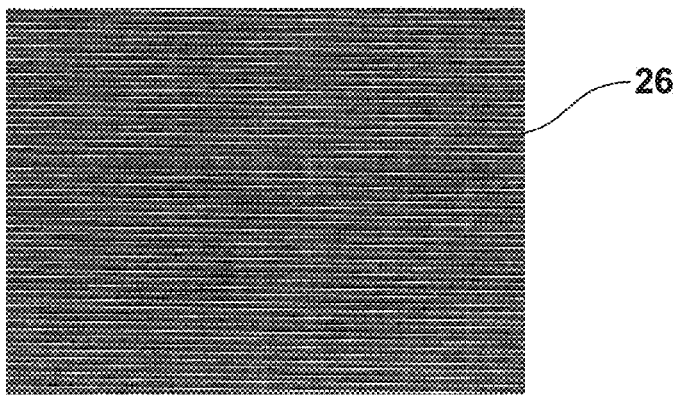
Figure 4C:
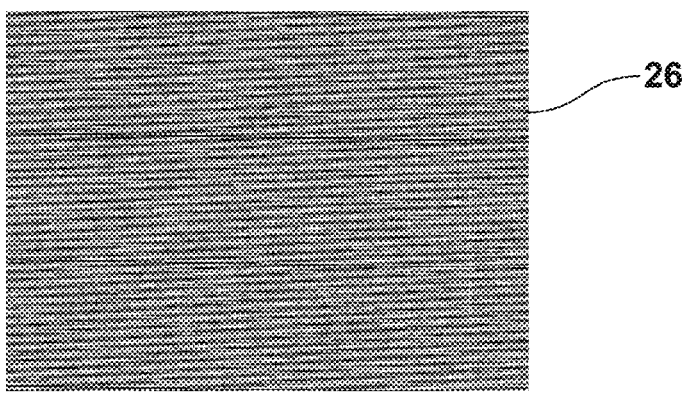

In yet another embodiment illustrated in FIG. 4c, the textured surface 28 may comprise fine lines or ridges in an elongated "X" horizontal crosshatch pattern. Here it should be appreciated that the textured surfaces 28 illustrated in FIGS. 4a-4c are merely presented for purposes of illustration and that other textured surface patterns or even random textured surfaces could be utilized so long as they increase the surface tension of any water coming in contact with the textured surface so as to promote beading of the water on the surface and retaining of the water thereon rather than allowing trickling of the water across the surface and subsequent dropping from the feature 26 through the body side opening 14 into the interior 38 of the vehicle.

In summary, numerous benefits result from employing the drip resistant textured surface feature 26 on the header margin 32 and/or the A-pillar 16 overlying the body side opening 14 and doors 22, 24 of the vehicle 10. As noted above, the textured surface 28 of the feature 26 has a surface energy engineered to enable water to form a bead whereby the water is retained on the surface rather than trickling into the vehicle when a second door 24 is closed and air is forced over the A-pillar 16 and header margin to reduce air pressure in the interior of the vehicle. This is a particularly prevalent problem in vehicles incorporating front hinged front doors 22 and rear hinged rear doors 24 which are often desired by vehicle operators who want greater clearance and inside access unimpeded by a permanent B-pillar. As should be appreciated, any water trickling from the A-pillar 16 or header margin 32 into the vehicle V or onto an operator or other occupant is quite annoying and leads to great customer dissatisfaction. Advantageously, the drip resistant textured surface feature 26 substantially eliminates this problem and does so in a relatively inexpensive and production efficient manner.

The foregoing has been presented for purposes of illustration and description. It is not intended to be exhaustive or to limit the embodiments to the precise form disclosed. Obvious modifications and variations are possible in light of the above teachings. For example, the drip resistant textured surface feature 26 in the illustrated embodiment is an adhesive tape incorporating an adhesive backing 30 and a textured surface 28. It should be appreciated that substantially any other means of texturing the header margin 32 and/or A-pillar 16 that provides the desired water beading action and resistance to trickling could be utilized. Further, while a pick-up truck is illustrated in the drawing figures, it should be appreciated that the drip resistant textured surface feature may be utilized on other vehicles including coupes, sedans, sports utility vehicles, cross-over vehicles, trucks and the like. All such modifications and variations are within the scope of the appended claims when interpreted in accordance with the breadth to which they are fairly, legally and equitably entitled.

What is claimed is:

1. A motor vehicle, comprising:
   a body including a header margin at least partially defining a body side opening and further including an A-pillar defining a portion of said body side opening;
   a C-pillar;
   a first door received in and closing at least a first portion of said body side opening;
   a second door received in and closing at least a second portion of said body side opening, wherein said first door hinges adjacent said A-pillar and said second door hinges adjacent said C-pillar; and
   a drip resistant textured surface feature provided along said header margin above said first and second door, wherein said drip resistant textured surface feature is also provided along said A-pillar, and wherein said drip resistant textured surface feature comprises an adhesive tape having a textured surface including cross hatching.

2. The vehicle of claim 1, wherein said textured surface includes a plurality of parallel ridges.

3. The vehicle of claim 2, wherein said plurality of parallel ridges run horizontally along said adhesive tape substantially aligned with an upper edge of said body side opening.

4. A method of reducing dripping of water from a header margin of said body overlying a body side opening of a vehicle, comprising:
   applying a drip resistant surface feature along said header margin above said body side opening, wherein said applying step includes positioning an adhesive tape along said header margin wherein said adhesive tape includes a textured surface having cross hatching.

5. The method of claim 4, further including also applying said drip resistant textured surface feature along an A-pillar margin of said body side opening.

6. A motor vehicle, comprising:
   a body including a header margin at least partially defining a body side opening;
   a first door received in and closing at least a first portion of said body side opening;
   a drip resistant textured surface feature provided along said header margin above said first door, wherein said drip resistant textured surface includes an adhesive tape having a textured surface with cross-hatching.

* * * * *